Jan. 24, 1933.  G. A. MACREADY  1,894,995
CORE DRILL AND MEANS FOR ASCERTAINING DIP
Filed May 10, 1926    6 Sheets-Sheet 1
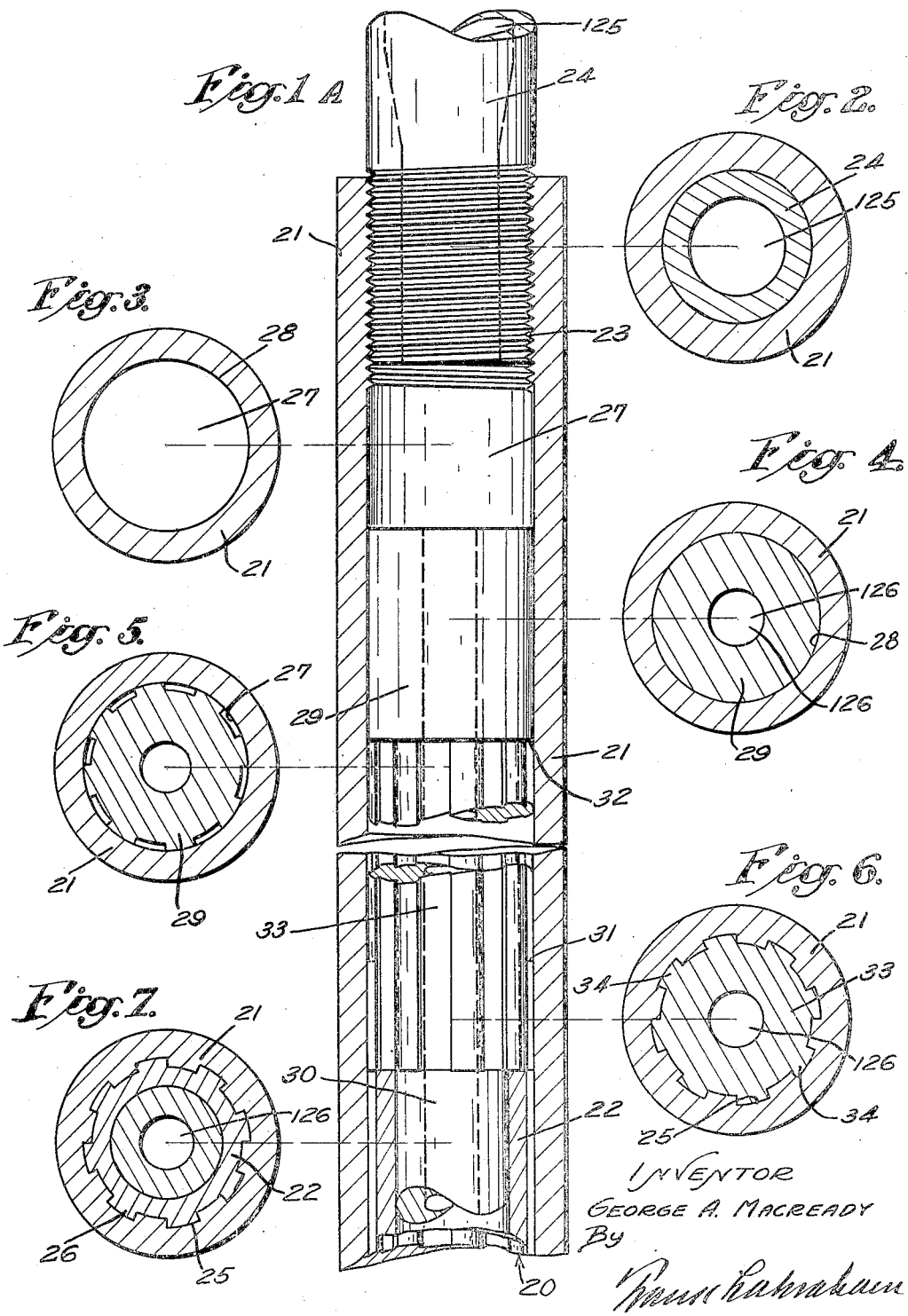
INVENTOR
GEORGE A. MACREADY
By
ATTORNEY Jan. 24, 1933.　　　G. A. MACREADY　　　1,894,995
CORE DRILL AND MEANS FOR ASCERTAINING DIP
Filed May 10, 1926　　　6 Sheets-Sheet 2
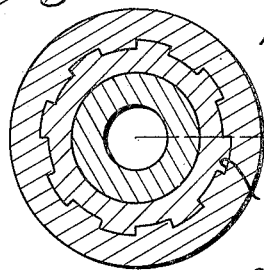
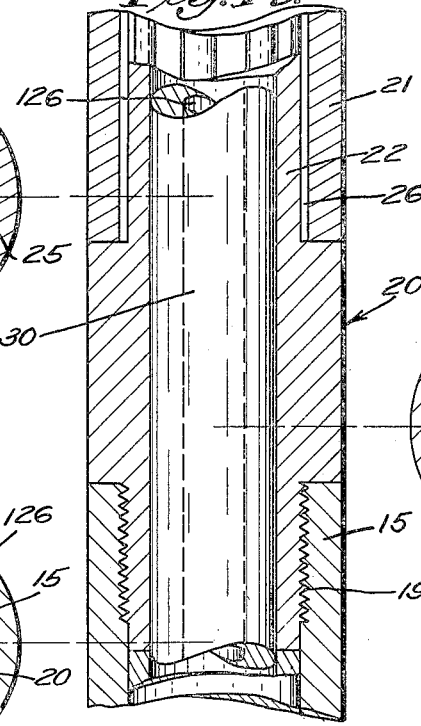
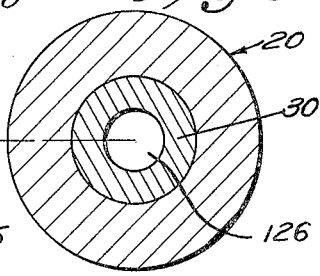
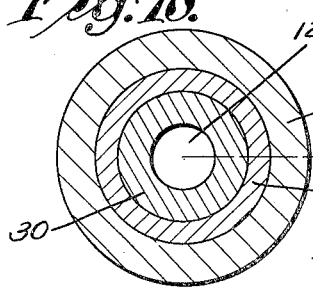
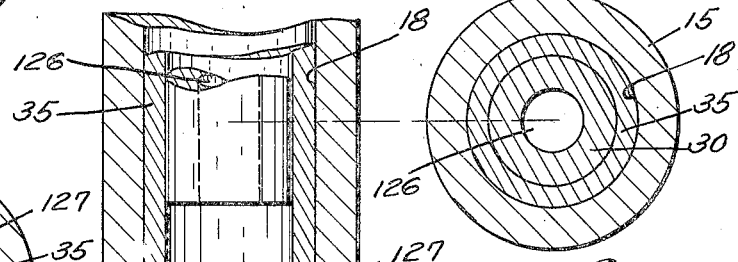
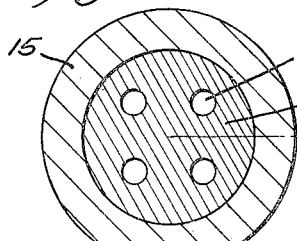
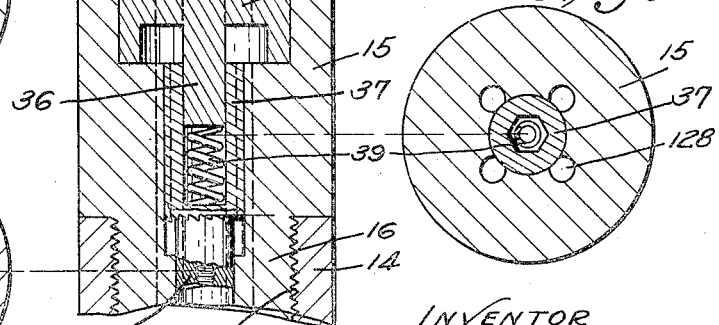
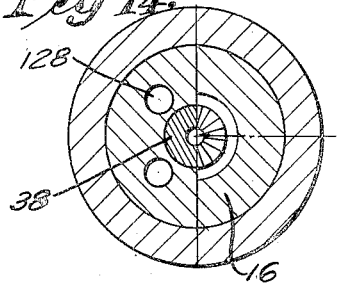
INVENTOR
GEORGE A. MACREADY
By
ATTORNEY

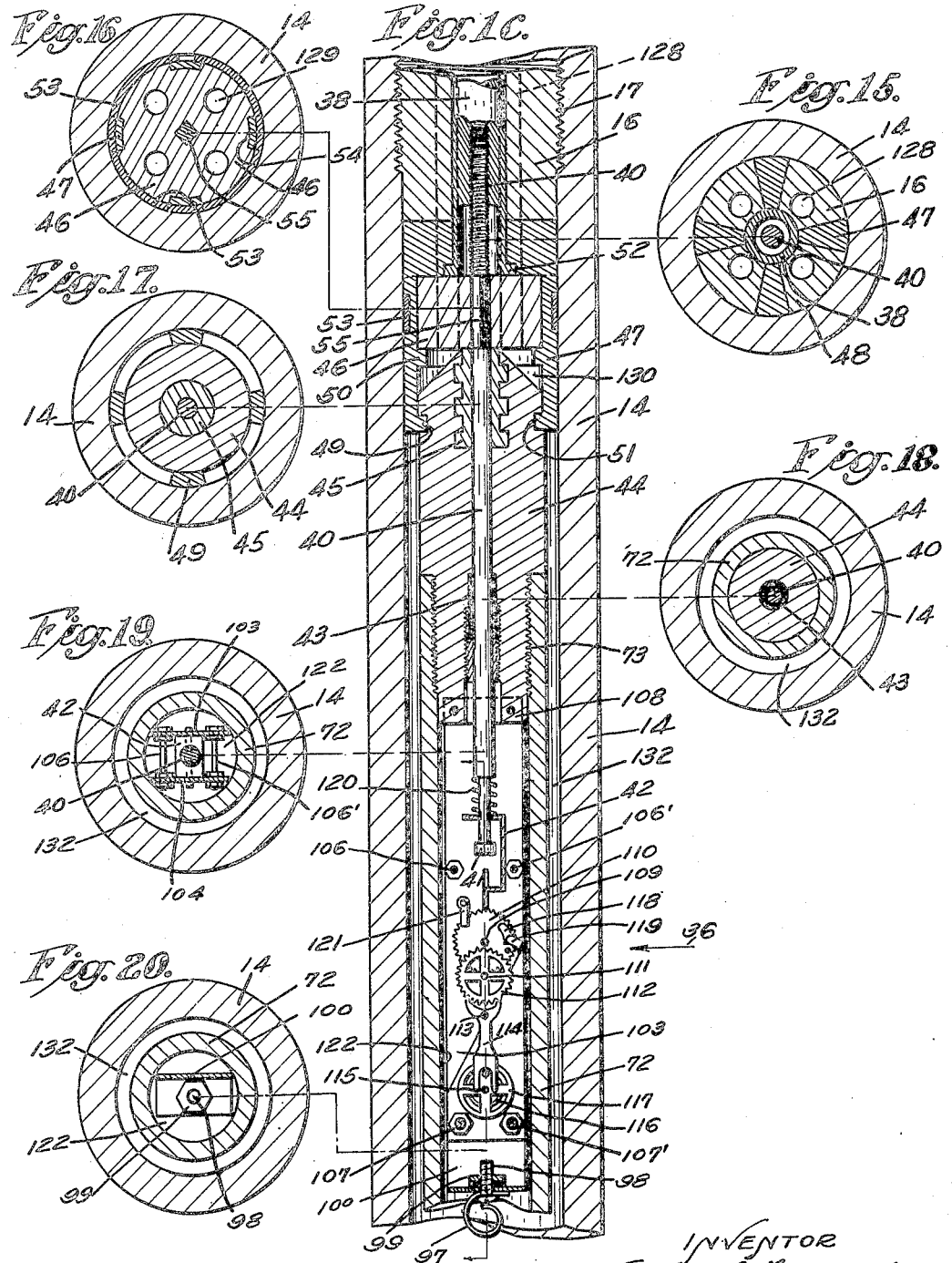

Jan. 24, 1933.     G. A. MACREADY     1,894,995
CORE DRILL AND MEANS FOR ASCERTAINING DIP
Filed May 10, 1926     6 Sheets-Sheet 4
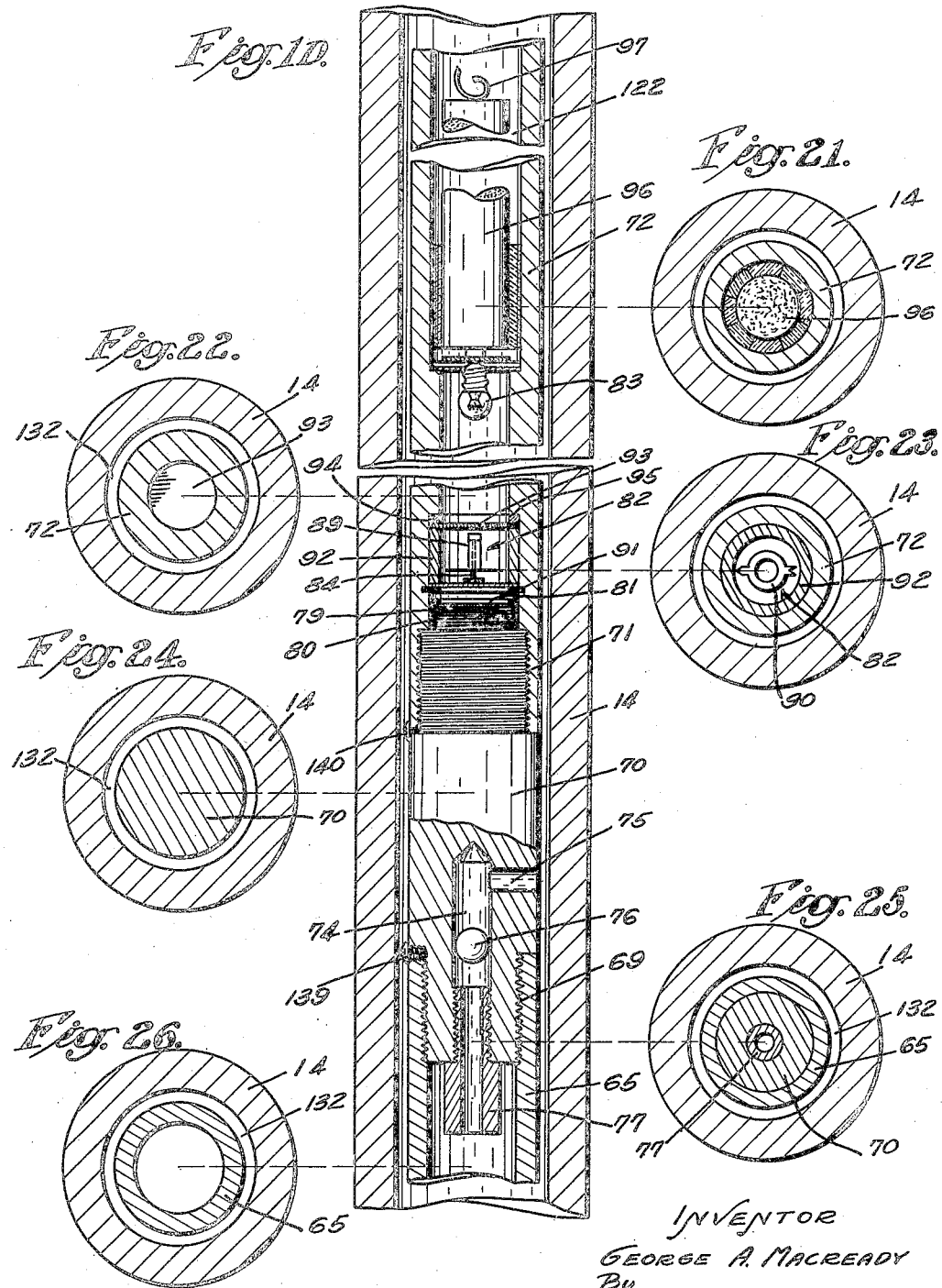
INVENTOR
GEORGE A. MACREADY
By
ATTORNEY Jan. 24, 1933.  G. A. MACREADY  1,894,995
CORE DRILL AND MEANS FOR ASCERTAINING DIP
Filed May 10, 1926   6 Sheets-Sheet 5
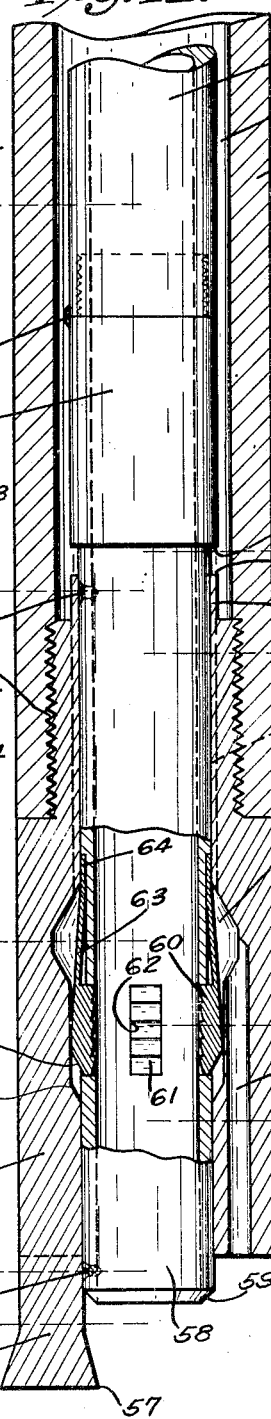
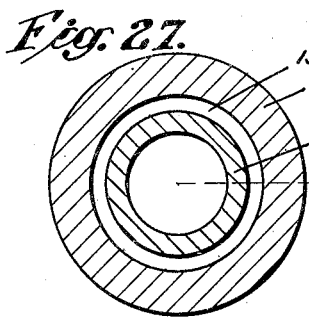
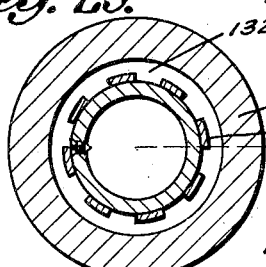
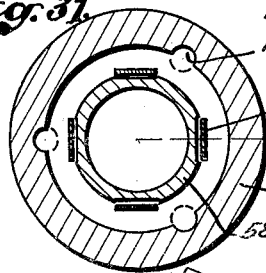
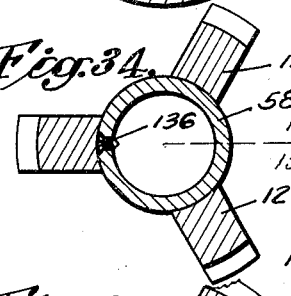
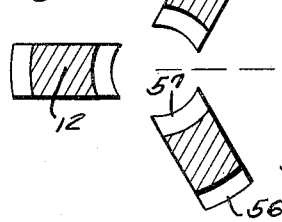
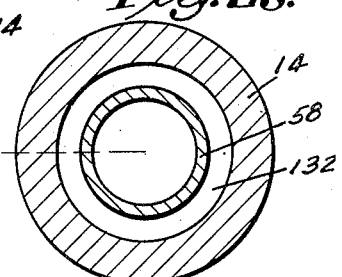
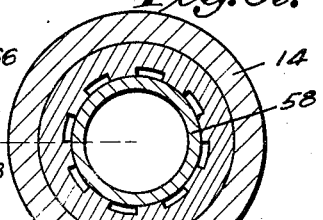
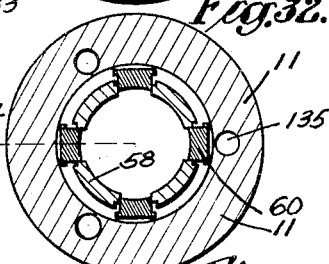
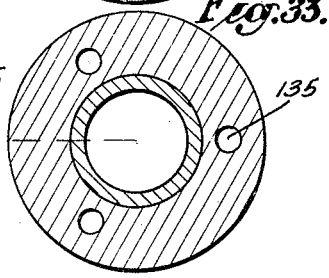
INVENTOR
GEORGE A. MACREADY
By
ATTORNEY Jan. 24, 1933.  G. A. MACREADY  1,894,995
CORE DRILL AND MEANS FOR ASCERTAINING DIP
Filed May 10, 1926  6 Sheets-Sheet 6
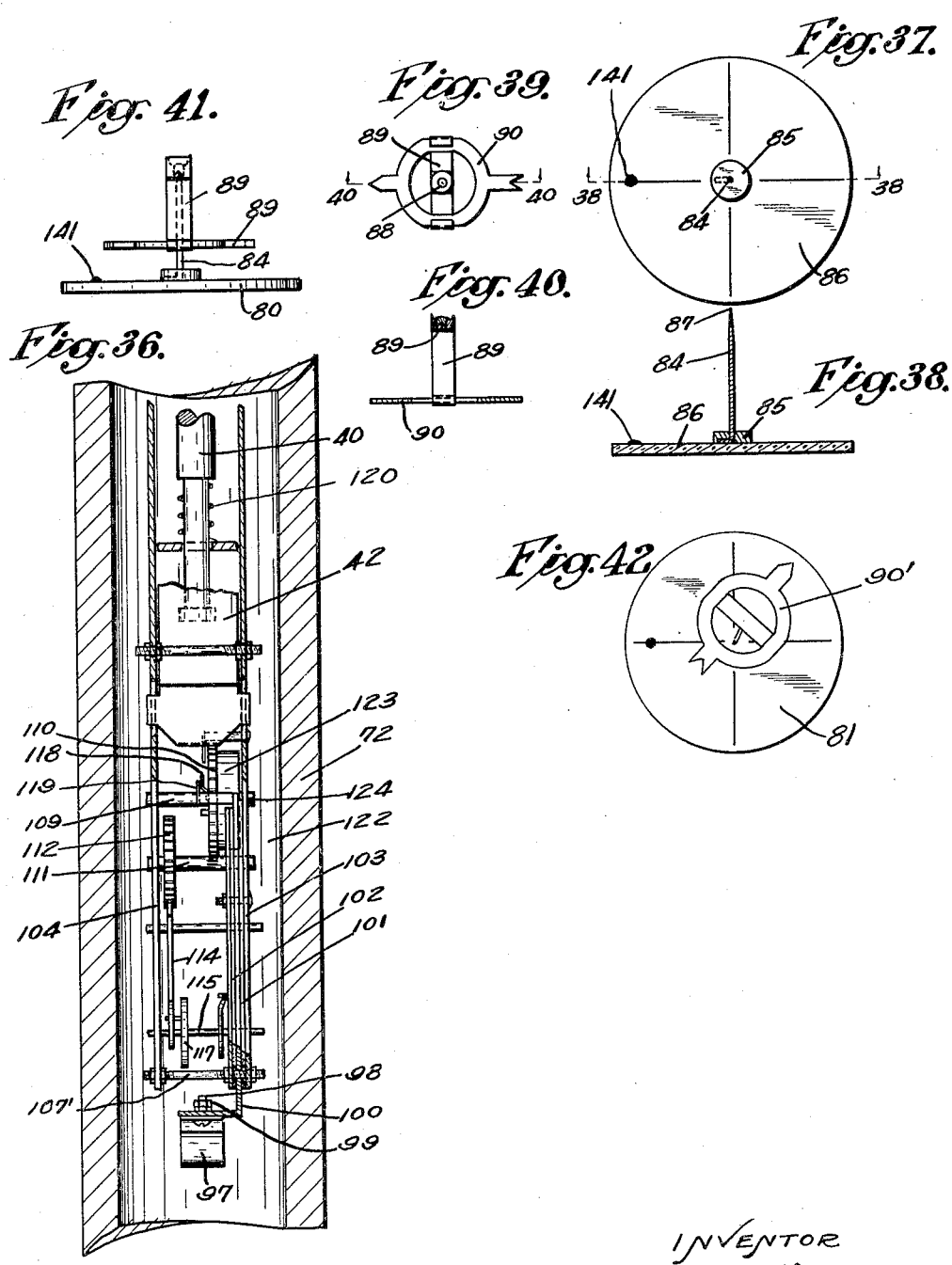

Patented Jan. 24, 1933

1,894,995

UNITED STATES PATENT OFFICE

GEORGE A. MACREADY, OF LOS ANGELES, CALIFORNIA

CORE DRILL AND MEANS FOR ASCERTAINING DIP

Application filed May 10, 1926. Serial No. 107,980.

As may be inferred from the above title, it is a primary object of this invention to provide a core drill with means for ascertaining the direction and amount of dip (or inclination) of strata, as they naturally occur below the surface of the ground; and preferred embodiments of my invention accordingly comprise, in addition to means for cutting a core, interior means for receiving said core and/or means to hold the same against rotation, as well as photographic means, utilizing a compass needle, for revealing the orientation of said core or core-receiving means, at the time of the cutting of said core.

Petroleum is known to occur at or near anticlines in stratified sediments. These sediments occur in inclined and nearly parallel layers, sloping downward and away from the anticlined axis. A geological investigation of artificial or natural cuts or other excavations, and study of the dip or inclination of superficial strata, is often adequate to determine the position of an anticlined axis; but, in localities covered by alluvial deposits or by excessively deep soil, the inclined strata are often so concealed that the ordinary geological examination is impossible or insufficient.

When cores are obtained from wells they frequently show inclined planes of stratification or bedding. It is an easy matter to measure the amount of this dip or inclination, but heretofore it has not been possible accurately and reliably to determine the direction of the dip,—which is of paramount importance in suggesting the location of the anticlinal fold. By the use of my core drill, the original direction-position or orientation of the core as it originally occurred in the bottom of the well can be ascertained; and, with the core oriented, the direction of dip is a simple deduction, if stratification marks exist in the core.

By the use of my core drill and the associated parts, these being intended especially for use in so-called "wild-catting" or exploratory well drilling, in search of new oil fields, the inclination of strata hidden beneath alluvium and/or soil can be reliably determined; and from this information favorable areas can be selected for further prospecting, or to be tapped for immediate production.

Other objects of my invention, including the provision of an improved core-cutting shoe or bit provided with teeth having both inward and outward radial projections; the provision of means for holding a core barrel stationary relatively to a stationary core received therein, the provision of means for so supporting a magnetic needle that a photograph thereof incidentally reveals any deviation from true verticality; the provision of means for holding a sensitized plate; the provision of means for utilizing energy from a dry cell, or the like, in exposing said plate; provision of means for deferring and timing the exposure of said plates; and provision of means rendering the rotation of a drill string alternatively effective either to cut a core or to initiate movement of interior parts whereby I may obtain (after the drilling organization has come to rest) a photograph of a compass (indicating both the inclination and orientation of a contained core) may be best appreciated from an illustrative embodiment of my invention, taken in connection with the appended claims and the accompanying drawings, in which A view extending centrally of all sheets, excepting the last sheet, may be regarded as a substantially vertical sectional view, with parts broken away,—this view comprising Figs. 1A, 1B, 1C, 1D and 1E.

Figs. 2–35 inclusive are respectively transverse sectional views, taken substantially as indicated by the lines respectively extending thereto from Figs. 1A, 1B, 1C, 1D and 1E.

Fig. 36 is a vertical sectional view on an enlarged scale corresponding to the lower portion of Fig. 1C and taken substantially as indicated by the arrow 36 of said figure.

Fig. 37 is a top plan view of a compass support comprising a transparent plate, as hereinafter described.

Fig. 38 is a vertical section, taken as indicated by the line 38—38 of Fig. 37.

Fig. 39 is a top plan view of a compass needle of a preferred type, suitable for use upon a support of the general character illustrated in Figs. 37 and 38.

Fig. 40 is a vertical section, taken substantially as indicated by the line 40—40 of Fig. 39.

Fig. 41 is an elevational view, showing the mentioned compass elements in their assembled relationships.

Fig. 42 is a view of a photograph, taken as hereinafter described, and indicating not only the orientation of a core but an inclination thereof, at the time the picture was taken.

Referring to the details of that specific embodiment of my invention chosen for purposes of illustration, my core-cutting organization may be regarded as comprising a shoe or bit 11, downwardly terminating in teeth 12 and rigidly connected, as by a threaded engagement at 13, with a tubular body or case comprising a lower case section 14, and a coupling 15,—the latter being provided with a downward extension 16 carrying threads 17 for engagement therewith and being provided, at its upper end, with a concavity 18, threaded in turn at 19 to retain a torque block 20. All of the parts below this block being rigidly interconnected, during drilling operations, rotation may be imparted thereto in any suitable way, as by means of an upper tubular case section 21, shown as having a splined connection with an upwardly extending portion 22 of the mentioned torque block and as threaded, at its upper end 23, for engagement by a section of rotary drill pipe 24, or the like.

The tubular section 21, although longitudinally provided with interior channels 25 in the lower portion thereof, as best shown in Figs. 6, 7 and 8 (said channels being there engageable by corresponding vertical ribs 26, projecting out from the extension 22 of the torque block 20) is provided in an intermediate region 27 with a smooth bore 28, as best indicated in Figs. 3 and 4.—this bore being adapted to receive a head 29 and to limit the relative upward movement of the section 21 by an engagement between shoulders 31 (at the upper ends of channels 25) and a shoulder 32 at the lower edge of said head. Using the described construction, and providing an intermediate portion 33 of the interior tubular element 30 with longitudinal ribs or projections 34 (see Fig. 6) so positioned as to compel the interior tubular member 30 at all times to rotate with the exterior case section 21, or its equivalent, the elevation of the string, and therewith the case section 21, sufficiently to effect a disengagement between the channels 25, cut therein, and the longitudinal ribs 26, in the upper extension 22 of the torque block 20, may be effective to discontinue rotation of the latter by the former, so as to discontinue drilling, for a purpose hereinafter described.

Emphasizing at this point the fact that the intermediate and vertically ribbed portion 33 of the interior element 30 preferably has exactly the same external configuration as that upper extension 22 of the torque block 20 by which the bit 11, or its equivalent, is normally rotated, I may mention that a head 35, shrunk, pinned, or otherwise rigidly secured upon the lower end of the interior member 30, is intended to serve as a swivel connection limiting (by reason of engagements above mentioned) the upward movement of the case section 21 relatively to the torque block 20,—and that, after such elevation has been effected (exempting the torque block from rotation) a subsequent continued but limited rotation of the drill pipe 24, or its equivalent, may be employed, in conjunction with any suitable intermediate mechanism, to snap a photograph, or to release a clock work for this purpose,—as by the transmission of motion through hexagonal or other non-circular subsidiary shaft 36, slidably interfitting within a ratchet element 37, of corresponding interior configuration, to impart rotation to a female threaded element 38, or its equivalent.

Assuming a ratchet connection between the non-circular, relatively slidable element 37 and the screw 38, both being freely rotatable within the coupling element 15 or the downward extension 16 thereof (and means such as an interior spring 39 being employed to effect a one-way engagement between cooperating ratchet faces upon the mentioned elements) I may provide, for example, a threaded rod 40 with means such as a head 41, for engagement with a longitudinally slidable trigger element 42; and I may interpose between the lower end of the extension 16 upon the coupling 15 and stationary parts disposed therebelow any suitable means permitting relative rotative movement between the interiorly threaded screw 38 (whose rotation is intended to impart longitudinal movement to the rod 40) and stationary (non-rotative) parts through which the said rod also extends. For example, preferably providing a stuffing box at 43 in a plug 44, intended always to remain "stationary", and optionally inserting in said plug a bearing or thrust piece 45 (preferably of a very hard material) I may dispose thereabove a relatively rotatable thrust piece 46, retaining the same in its indicated position (while providing for a downward circulation of a lubricating fluid as hereinafter described) by any suitable means,—as by the use of separate retaining brackets 47, extending vertically between apertured terminal portions or fingers 48 of the coupling 15, these being shown as provided with inwardly extending lugs 49 and 50, respectively engaging a channel 51 in the plug 44 and extending beneath the movable thrust piece 46, and the latter being shown as engaged by an extension 52, at the lower end of the rotatable screw 38, and as retained by a circumferential spring clip 53.

It will be seen that, by reason of the interposition of the fingers 48, or their equivalents, integral with the coupling 15, between the brackets 47, and by reason of the disposition of these brackets in vertical slots 54, provided in the thrust piece 46, the rod 40 being provided with an intermediate squared section 55, always interfitting within a corresponding aperture in the thrust-piece 46, so long as the coupling 15 and all parts therein are rotated together and at the same rate, the rod 40, or its equivalent, may merely rotate within the plug 44,—the latter not participating in the mentioned rotation; but that, whenever drilling is discontinued, and the coupling 15 is exempted from rotation, any subsequent rotation of the drill string 24, or its equivalent, must produce a vertical movement of the rod 40, by reason of the engagement of the female screw 38 with the threaded upper portion of said rod,—the latter being held against rotation (when the torque block 20 and external parts therebelow are stationary) by means comprising its squared section 55; but I defer description of the mechanism, operated by the trigger 42, for the taking of a picture, in order first to describe my preferred core-receiving organization and associated parts,—which are intended never to participate in rotation, although gradually descending, for the taking of a core.

The teeth 12 of the drill body or shoe 11 are shown as provided not only with outward radial projections 56 (to provide an external clearance) but with inward radial projections 57,—the latter serving to provide clearance for a vertically movable but non-rotative core receiving barrel 58. This core barrel is shown as downwardly terminating in inwardly beveled edges 59 and as provided with core-retaining clips 60,—roughened portions 61 of the latter being resiliently pressed outward, through openings 62, by means such as integral springs 63, whose upper ends 64 may be secured preferably in vertical slots, in any suitable way, as by welding.

Parenthetically, I may mention that, during the operation of cutting a core the weight of the inner core barrel assemblage is supported by engagement of the inner bit edge 59 resting on a shoulder of the core; but, as cutting by teeth 12 advances, the entire weight of the drill pipe column can come into effect upon the inner core barrel assemblage to force it downwardly over the core without rotation,—the bit edge 59 optionally slicing a thin layer off of and outwardly from the surface of the core by a chisel-like action. Consequently the downward movement of core barrel 58 may lag behind the downward movement of bit head 11, the tapered shoulders 150 of clips 60 being held above and out of contact with the tapered annular shoulder 151 of bit head 11; also the clips 60 are expanded by springs 63 into the enlargement 134 so that they do not scrape or jam on the core. The space between shoulders 150 and 151 before engagement is less than the space between shoulders 66 and 67 and less than the vertical play allowed at fingers 47 and 48. When the core drill is withdrawn from the well the weight of the inner core barrel assemblage no longer is supported on the core, and shoulders 150 engage shoulders 151,—which, being tapered cause inward movement of clips 60 to grip the core tightly and insure recovery of said core. This wedge-like action causes a very positive grip on the core. Other forms of core-retaining devices can, however, be used, this not being one of the principal features of the invention.

The upper end of the core barrel 58 (shown as sufficiently expanded at 65 to provide a shoulder 66, engageable by cooperating shoulders 67 at the upper end of extensions 68, integral with the shoe or bit 11) may be threaded, as at 69, into a coupling or plug 70; and the latter may in turn carry, as by a threaded engagement therewith at 71, a tubular element 72, interiorly threaded at 73 for engagement by the mentioned plug 44, through which extends the trigger-operating rod 40,—the chamber or chambers within the tube 72 being thus adapted to house a compass needle, suitably supported, and means for photographing the same, upon withdrawal of the trigger 42, or its equivalent.

I mention, in passing, that the coupling or plug 70 is preferably provided with valved passages 74, 75 (the former shown as containing a ball 76, retained by a threaded seat 77) in order that any fluid material which may enter the barrel 58 during the initial lowering of the entire organization can escape into an annular space, provided within the tubular case section 14, or its equivalent, for a downward delivery of a lubricant; but these valve features, being similar in principle to constructions heretofore employed in analogous relationships, are of less interest than the dip-indicating and photographing devices which I will now proceed to describe.

I show the upper end of the coupling or plug 70 as provided not only with the mentioned major external thread 71, but with a subsidiary threaded extension 79, engageable by an interiorly threaded clip 80 for the retention of a photographic sensitized plate 81; and above this plate I may dispose any suitable compass 82 and any suitable controllable means, including an incandescent electric light bulb 83, for effecting a momentary illumination.

Although I may use a compass organization of any preferred type, I show, in Figs. 37–41, details of one suitable compass,—this comprising a pin 84 vertically secured by a block 85, upon a transparent circular disc 86,—the point 87 of this pin being adapted to enter a corresponding depression 88 in a stirrup 89, carrying a magnetized needle 90. This compass organization, or its equivalent, may be secured above the sensitized plate 81, or its equivalent, by means such as an annular clip 91, disposed therebelow, and a spacing tube 92, immediately engaging the plate 86; and above the latter I may optionally interpose a second transparent plate 93, adapted to prevent dislodgment of the stirrup 88 from the pin 84, or its equivalent,—a resilient or other packing element or clip 94 being optionally interposed above the transparent plate 93 and below retaining shoulders 95.

The pin 84 may be partially or entirely constructed of a non-magnetic material, in order that the compass needle 90, when used with a long stirrup 88, may not be caused to stick against the side of pin 84 because of magnetic attraction. In wells which are nearly vertical, and penetrate strata which dip at angles of several degrees the determination of the deviation of the well from vertical is not of great importance in the measurement of the direction of dip of strata, so that a high stirrup 88 is not necessary and an ordinary compass needle with a low pin 84 can be used. Because of vibration during drilling, the useful life of the compass will be short, but it will be observed that the position and construction are such that it is accessible and replaceable at small cost. Except as noted, it is desirable that the pin 84 and the stirrup 89 shall be of considerable vertical height, in order that, in case the entire drilling organization occupies an inclined position in a well, the direction of its inclination (as well as the orientation of the core) shall be revealed in a photograph thereof, as taken by means including the incandescent bulb 83, or its equivalent, engaged in any suitable way, as by means of a dry cell or dry cells 96,—current being permitted to pass therefrom through the tube 72 and the filament of the bulb 83 upon the closing of a circuit which includes a resilient contact 97 and also a suitable contact subject to control by clock work, or by other suitable means.

For example, the contact 97, may be secured as by means of a bolt 98 carrying a nut or nuts 99, to a conductive plate 100, this conductive plate being normally insulated from the tube 72 as by the interposition of non-conductive insulating plates 101, 102, between the same and a clock work-enclosing frame comprising parallel plates 103 and 104. These plates may be held in spaced relationship by means of bolts 106, 106', 107, 107', and/or by engagement, as at 108, with the plug 44, and/or by a mere drive fit within the tube 72. Between the plates 103, 104 or their equivalents, I may provide shafts 109 (driven by a concealed main spring and carrying wheel 110) 111 (carrying an escapement wheel 112) 113 (carrying an escapement lever 114) and 115 (carrying a hair spring 116 and a balance wheel 117); and the main wheel 110, or its equivalent, may carry a contact 118, whose engagement by a cooperating contact 119 on the plate 100, is adapted to complete a circuit through the incandescent bulb 83,—the duration of this contact and the consequent illumination of said bulb being dependent upon the angular length of the contact at 118 and/or the contact 119, and upon the rate of rotation of the wheel 110. The mentioned trigger 42, movable by the rod 40 (this rod being normally held in a lowered position by the brackets 47, and the said trigger being normally held in a lowered position relatively thereto by means such as an additional spring 120) is normally effective to hold the wheel 110 against rotation; but an elevation of the rod 40, or its equivalent (either by the described means or any preferred means) is obviously effective to release the wheel 110; and the rotation of this wheel may be limited in any preferred manner, as by means of a dog 121. It will be obvious that any lubricating fluid forced downward between the tube 72 or its equivalent, and the case 14, or its equivalent, must be prevented from entering the chamber 122, containing the battery 96 and/or the described clock train, or its equivalent; and, it will also be understood that the main spring, whether or not housed within a drum 123 to which the wheel 110 is shown as secured, must be wound, as by means of a squared head 124, in advance of the disposition of said clock train within said chamber.

It will be observed that the tube 72 has thick walls and is open only at the ends where it is sealed by plugs 44 and 70 both of rugged construction; consequently the construction is such as to protect the delicate apparatus contained in tube 72 from the high pressures which exist in deep wells; and it will be appreciated that special problems are involved in the delivery of a lubricating fluid through a rotary drilling organization provided not only with a stationary core barrel but with a magnetic compass and with photographic and illuminating means, with or without clock work. I accordingly point out that any lubricating liquid, forced downward through a central passage 125 in the operating string 24, may advance through a central passage 126 extending through the interior member 30, thence through one or more eccentric passages 127, in the head 35, movable therewith, through similar passages 128 in the coupling element 15 and its extension 16, and by way of fingers 48, integral therewith, through coincident passages 129 in the movable thrust piece 46; and, it may pass thence downward and outward through spaces 130 and 131, interiorly of and between the brackets 47, into annular spaces 132 between the tube 72 and the surrounding case section 14; and the shoe or bit 11, including its upward extension 68 (when the latter is provided) may be formed with interior vertical channels, as at 133, opening in any preferred way, as by means of an annular passage 134 and bores 135, through and/or between the teeth 12, or equivalent cutting elements.

It will be understood from the foregoing that when a core is to be taken, the shaft 24 having been rotated in an ordinary manner for a period sufficient to advance the bit 11, or its equivalent, through an appropriate vertical distance, and the teeth 12 thereof being, during this interval, effective to so undercut the barrel 58, or its equivalent, as to permit the same to descend and to protect a core (said barrel and core remaining "stationary" as to rotation) while the bit is rotated, the string 24 may then be lifted sufficiently to disengage the indicated splined connection, comprising channels 25 in the upper case section 21 and interfitting ribs 26 upon the upward extension 22 of coupling 20,—with the result the subsequent rotation of the string 24 is ineffective to impart movement to the drill bit 11, or its equivalent. Further rotation of the string 24 is, however, then effective (by reason of a continued engagement of vertical ribs 34 within the channels 25 in the interior of the separately movable upper case section 21) to elevate (by the described intermediate means) the trigger 42, or its equivalent; and the initial position of the contact 118 upon the wheel 110, so released, may be such as to permit any desired period (as a period of 120 seconds) to elapse, before the cooperating contact 119, or its equivalent, is engaged to energize the incandescent light 83, or its equivalent.

After making sufficient exposure, as predetermined, the contact between 118 and 119 is broken and the timing mechanism is stopped a few seconds later by engagement of dog 121. The purpose of dog 121 is to stop the timing mechanism after one photographic exposure has been made in order to avoid the confusion which would obviously be caused by several successive exposures, particularly if the mechanism were permitted to operate after work of removing the apparatus from the well has started. Spring 120 is for the purpose of preventing premature release of trigger 42 by vibration during drilling.

The mentioned provision for an interval of rest between the withdrawal of the trigger 42 and the taking of a picture is intended to permit all parts to come to rest and vibration to cease; and it will be obvious that a predetermined exposure of the plate 81, or its equivalent, may produce a picture (see Fig. 42) in which the outline of the compass needle 90, or its equivalent, may appear somewhat as indicated at 90' in Fig. 42, the position of shadow image constituting a reliable means for establishing not only the orientation, but the inclination of the core barrel 58, and/or a core taken in the general manner described.

Assuming that the core barrel of the general character illustrated is employed, I consider it advantageous to provide the same with an inwardly projecting rib or ribs or points, as by the insertion of a pointed screw or screws, somewhat as suggested in dotted lines at 136 and/or 137,—the use of a plurality of points in preference to inwardly extending ribs having, inter alia, the advantage that any spiral inclination or non-coincidence of scratches thereby produce upon the contained core is indicative of a corresponding failure of the materials of said core to remain entirely stationary during the cutting and enclosure thereof; and I consider it advantageous (whether or not the core barrel comprises separable sections, as indicated at 65 and 65', to facilitate removal of a contained core,—means such as a radial screw 138 being optionally employed positively to prevent independent relative rotation of said sections) to secure both the mentioned core barrel, or its equivalent, and the tube 72 (by which the described photographic apparatus and clock work are protected) to the valved coupling or plug 70, or its equivalent, by means including not only the threaded connections 69, and 71 but also screws 139, 140—these serving not only to prevent relative slippage but to establish a vertical continuation of a line through the screws 136 and 137 and/or 138. As a further precaution in establishing not only the orientation of the needle 90 relatively to the sensitized plate 81, but the relationship of this plate to the tube 72 and/or the core barrel 58 and/or any core cut by the teeth 12, or by equivalent means, I may provide, as upon the transparent disc 86, or its equivalent, an opaque dot or minute mass 141,—carefully positioning the same, during assembly of the described parts which are intended to remain stationary during the cutting of a core, in the same line or plane with the screws 136, 137, 138, 139 and/or 140, or their equivalents. By bringing the image of this dot into the same plane with the longitudinal or vertical scratch produced by the screws 136 and/or 137 or by equivalent means, and then orienting the core and superimposed photograph to such a position as brings the point of the needle image 90' to the north (with due allowance for any local magnetic variation) it will be obvious that I am enabled to bring the core into a position exactly similar to that which its substance occupied in the underground formation; and by noting the inclination of any strata revealed in the core (making any necessary allowance for inclination of the core barrel) I am accordingly enabled to infer the amount and direction of dip of such strata and the direction in which drilling or further prospecting may advantageously be begun or continued.

In drilling through some classes of rock the use of screws at 136, 137, 138, 139, 140 may not be desirable because of wear or loosening occasioned by vibration. Instead, a marker rib or point can be used at 136 integral with core barrel 58 to orient the core with respect to core barrel 58, and a mark placed as at 140 on the tube 72 which should be of known position relative to the mark 141 on the compass plate 80. Observation of the relative position of points 136 and 140 when the core is withdrawn from the well serve to orient the core with respect to the photograph, and from the compass image the original direction orientation of the core can be determined. The dip of strata can be determined then, both for amount and direction, if lines of stratification are found on the core. Because of the breakage of sections of the core in the barrel and other effects of vibration the most reliable segment to determine direction of dip of strata is obviously that segment recovered in the lowest portion of the core barrel 58.

In conclusion, I may mention the somewhat obvious fact that, assuming a compass to be employed in the establishment of the orientation of the core barrel 58, or the orientation of a core received in any preferred manner, only non-magnetic metals should be employed in immediate association therewith,—a failure to observe this precaution having heretofore been found to deprive somewhat analogous organizations of their utility; and I may mention also that all parts above and including the coupling 15, or its equivalent, are intended to be permanently shop-assembled,—the lower case section 14 being either attached or separately handled. The timing and photographing mechanism may also be separately shop-assembled relatively to plug 44 and all parts through which the rod 40, or its equivalent, extends. The timing mechanism being then wound, and trigger 42 and dog 101 being properly set, the batteries and sensitized plate are properly positioned, and the core barrel is attached. Upon the insertion of the resultant assemblage from the bottom of the lower case section 14, or its equivalent, subsequently to the attachment of lower case section 14, the positioning of the cutting bit or shoe 11, or its equivalent, is effective to hold all parts in their assembled relationship, although permitting the core barrel and its associated position-establishing devices to remain stationary while the parts surrounding and/or above the same are rotated for the cutting and/or photographing effects above described.

Although I have herein described a single complete embodiment of my invention, it should be understood not only that various features thereof are capable of independent use but also that numerous additional embodiments thereof might be devised, by those skilled in the art to which this case relates, without involving the slightest departure from the spirit and scope of my invention, as the same is indicated above and in the following claims.

I claim as my invention:

1. In an apparatus of the general character described: a hollow core cutting bit: a core receiving barrel therein extending beyond the hollow portion of said bit and rotatable relative to said bit: and an orientation recorder carried by said barrel, there being a passage for conducting circulation fluid down past said recorder and barrel.

2. In a combined core taking and recording apparatus: a core drill carried by drill pipe: a direction and inclination recorder carried by said core drill: and means causing said recorder to record a direction and inclination relative to a core taken by said core drill before said core is broken from its original underground position, said means being actuated by raising and rotating the drill pipe.

3. In a combined core taking and recording apparatus: means, carried by a drill pipe, for so cutting a core as to leave the same temporarily in an original underground position relatively to the ground rock from which it may be cut: and photographic means for recording said position relatively to a known direction, in advance of a removal of said core from said position:—said means being provided with a mechanism for regulating a timing of said recording apparatus and with means, operable by the rotation of the drill pipe, for starting said mechanism to operate.

4. A recording apparatus for use in wells comprising a hollow core cutting bit, a core receiving barrel therein, a magnetic needle, an orientation identification mark on the external surface of said barrel, and a photographic recorder for recording the position of said needle relative to said mark.

5. A recording apparatus for use on core drills comprising a drill string, a hollow drill thereon, a hollow core cutting bit, a core receiving barrel, a magnetic compass needle, a mark attached to said barrel, a photographic recorder adapted to record the position of said needle relative to said mark, and a trigger operable from the ground surface by rotation of said drill string for starting said photographic means to operate.

6. An apparatus for orienting cores comprising an outer tube, a rotary core cutting bit attached to the lower end of said tube, an inner member including a core receiving barrel and a direction recording instrument rotatable relative to and within said outer tube, a thrust bearing between said member and said tube, and a trigger extending through said thrust bearing into said instrument.

7. An apparatus for core drilling comprising a core drill, a fitting attached to the upper end of said core drill, an inner tube swiveled through said fitting and extending upwardly, and an outer tube having limited longitudinal movement relative to said inner tube and said fitting, said inner and outer tubes being provided with co-acting grooves and ribs to rotate in unison, said fitting being provided with grooves and ribs meshing with the grooves and ribs of said outer tube to prevent relative rotation when contracted and unmeshing when extended to permit relative rotation of said fitting and said inner tube, and said outer tube being provided with means for attachment to the lower end of a rotary drill string.

8. A core drill comprising an inner member including a core receiving tube and a direction recorder, a timer controlling said recorder and adapted to adjustably vary the time interval elapsing between assembling said core drill and making the direction record, and an outer tubular member rotatably disposed about said inner member and including a rotary core cutter on the lower end thereof.

9. An apparatus for core drilling comprising an inner member provided with a core receiving passage, a direction recorder carried by said member, a trigger organization adapted to cause said recorder to make a record at an instant selected after coring has commenced, and an outer tubular member rotatably disposed about said inner member and including a core cutter at the lower end thereof.

10. For use in combination with an orienting core drill, a core receiving barrel having a compass supporting member mounted upon the upper end thereof, a compass supporting pin mounted on the top of said supporting member, a compass rotatably mounted upon said pin, and a photographic plate upon said supporting member at the base of said pin.

11. A device for taking cores in a well comprising a drill barrel, a core tube mounted therein, the drill barrel being rotatably connected with the core tube, means for detachably suspending the core tube within the drill barrel, and means for forming an identifying mark longitudinally of the core as it enters the core tube whereby detached portions thereof may be properly aligned when the core is removed from the core tube.

12. A device for taking cores in a well comprising a drill barrel having a head member at one end whereby it may be connected with the drill stem, a drilling shoe at the other end of the drill barrel, a core tube suspended within the drill barrel and relative to which the drill barrel is rotatable, the diameter of the core tube being somewhat less than the interior diameter of the drill barrel, said head member being formed with a lubricating passageway communicating with the space intermediate the core tube and the drill barrel whereby a lubricant may be forced downwardly around the core tube to the drilling shoe, means whereby fluid entrapped within the core tube may escape to the space between for forming an identifying barrel, and means for forming an identifying mark on the core as it enters the core tube whereby disconnected portions of the core may be properly aligned upon removal of the core tube.

13. A core drill comprising: an outer barrel; a hollow rotary core cutting bit on the lower end of said barrel provided with cutting blades extending beyond the hollow portion thereof; an inner core receiving barrel rotatably mounted within said outer barrel and bit and projecting beyond the hollow portion of said bit; a thrust bearing connection between said barrels; and a marker projection on the inner wall of said inner barrel at the extreme lower end thereof projecting into the bore of said inner barrel so as to resist rotation of said inner barrel relative to a core received therein and to mark a longitudinal line on said core.

14. A rotary core drill for orienting cores comprising an outer barrel, a hollow core cutting bit attached to the lower end of said barrel provided with cutting blades extending beyond the hollow portion thereof, an inner core receiving barrel swiveled within said outer barrel and bit and projecting beyond the hollow portion of said bit, a thrust bearing between the upper ends of said barrels provided with circulation passages for conducting circulation fluid into the space between said barrels, and a check valve in the upper end of said inner barrel providing for exit of fluid from said inner barrel, said inner barrel being provided with an identification mark on that portion of the external surface thereof which projects beyond the hollow portion of said bit.

15. A rotary core drill for orienting cores comprising an outer barrel, a hollow core cutting bit attached to the lower end of said barrel provided with cutting blades extending beyond the hollow portion thereof, and an inner core receiving barrel rotatably mounted within said outer barrel and extending beyond the hollow portion of said bit, said inner barrel being provided with an identification mark on that portion thereof which projects beyond the hollow portion of said bit.

16. A core drill for orienting cores comprising an outer barrel, a hollow core cutting bit attached to the lower end thereof, and an inner core receiving barrel rotatably mounted within said outer barrel and provided with an identification mark on the external surface adjacent the lower end thereof whereby an individual orientation reference datum can be identified on said inner barrel.

17. In an apparatus for orienting cores: a hollow core cutting bit provided with cutting blades thereon, a core receiving barrel swiveled therein and projecting beyond the hollow portion of said bit between said blades, and a case carried by said barrel containing a magnetic compass and means for photographing the same.

18. A core drill comprising an outer barrel, a hollow core cutting bit attached to the lower end of said barrel provided with core cutting blades projecting beyond the hollow portion thereof, an inner core receiving tube swiveled within said outer barrel and bit and projecting beyond the hollow portion of said bit, a thrust bearing assembly connecting the upper ends of said barrel and tube provided with passages for conducting circulation fluid into the annular space between said tube and barrel, a check valve in the upper end of said tube providing for exit of fluid therefrom but obstructing entrance of liquid therethrough into said tube, said bit being provided with longitudinal ribs on the interior bore thereof contacting and centering the inner tube within said bit and providing passages for circulation fluid therebetween, said blades being proportioned less in cross section area than the cross section area of the spaces between each blade, said spaces serving for passage of circulation liquid from said core drill into the annular space between the core drill and the wall of a well, the lower end of said inner tube being provided with an annular cutting edge adjacent the interior wall thereof and externally beveled upwardly and outwardly from said edge, and the drilling position of said annular edge being between the base and tip of said blades.

19. In an apparatus for orienting cores: an outer barrel having a core cutting bit at the lower end thereof, an inner core receiving barrel swiveled therein having an orientation identification mark on its external surface, and a case carried by said inner barrel containing a magnetic compass and means for photographing said compass.

20. In an apparatus for orienting cores: an outer barrel having a core cutting bit at the lower end thereof, an inner core receiving barrel swiveled therein having an orientation identification mark on its external surface, and a case carried by said inner barrel containing a magnetic compass, a pendulum and means for photographing said compass and pendulum.

21. In an apparatus for orienting cores: a hollow core cutting bit provided with cutting blades thereon, a core receiving barrel swiveled therein and projecting beyond the hollow portion of said bit between said blades, and a case carried by said barrel containing a magnetic compass, a pendulum and means for photographing said compass and pendulum.

22. In an apparatus for orienting cores: an outer barrel having a core cutting bit on the lower end thereof, an inner core receiving barrel swiveled therein, and a case carried by said inner barrel containing a pendulum, a magnetic compass mounted on said pendulum, and means for photographing said pendulum and compass.

23. A core drill comprising an outer barrel and an inner barrel rotatable therein provided with an orientation identification mark on the external surface thereof adjacent the cutter end.

24. In an apparatus for orienting cores having an outer barrel rotatably mounted about a core receiving inner barrel and a core cutting bit on the lower end of said outer barrel: of a case carried by said inner barrel and containing a pendulum, a magnetic compass mounted on said pendulum and means for photographing said compass and pendulum.

In testimony whereof, I have hereunto set my hand at Bakersfield, California, this 29th day of April 1926.

GEORGE A. MACREADY.